United States Patent
Kung

(10) Patent No.: US 6,958,919 B1
(45) Date of Patent: Oct. 25, 2005

(54) ZERO VOLTAGE SWITCHING POWER CONVERSION CIRCUIT FOR A COLD CATHODE FLUORESCENT LAMP

(75) Inventor: Yung-Keng Kung, Hsinpu Chen (TW)

(73) Assignee: Samhop Microelectronics CORP, Hsintien (TW)

( * ) Notice: Subject to any disclaimer, the term of this patent is extended or adjusted under 35 U.S.C. 154(b) by 0 days.

(21) Appl. No.: 10/879,762

(22) Filed: Jun. 28, 2004

(51) Int. Cl.[7] .............................. H02M 3/335
(52) U.S. Cl. .................. 363/17; 363/56.02; 363/98; 363/132
(58) Field of Search .............................. 363/17, 56.02, 363/56.05, 98, 132

(56) References Cited

U.S. PATENT DOCUMENTS

| | | | |
|---|---|---|---|
| 6,396,722 B2 * | 5/2002 | Lin | 363/98 |
| 6,804,129 B2 * | 10/2004 | Lin | 363/98 |
| 6,819,057 B2 * | 11/2004 | Alexandrov | 315/209 R |
| 6,856,519 B2 * | 2/2005 | Lin et al. | 363/16 |
| 6,864,645 B2 * | 3/2005 | Sun et al. | 315/308 |

* cited by examiner

Primary Examiner—Bao Q. Vu
(74) Attorney, Agent, or Firm—Dellett & Walters

(57) ABSTRACT

A zero voltage switching power conversion circuit for driving a CCFL has a ZVS circuit and a full bridge circuit composing of MOS transistors. A transformer is coupled between the full bridge circuit and the CCFL. By properly controlling the conducting timing of each MOS transistor, power is coupled from the primary side to the secondary side of the transformer thus supplying power to the CCFL. When adjusting the brightness of the CCFL, the high frequency signal is able to be temporarily shut down during off periods of the CCFL to reduce power consumption.

20 Claims, 8 Drawing Sheets

ZERO VOLTAGE SWITCHING POWER CONVERSION CIRCUIT FOR A COLD CATHODE FLUORESCENT LAMP

BACKGROUND OF THE INVENTION

1. Field of the Invention

The present invention relates to a zero voltage switching power conversion circuit applied for a cold cathode fluorescent lamp (CCFL), more particularly, the power conversion circuit is able to provide high efficiency power by using the zero voltage switching (ZVS) technique.

2. Description of Related Art

With reference to FIG. 8, a conventional power conversion circuit for driving a cold cathode fluorescent lamp (CCFL) is shown. Such a power conversion circuit architecture is also named as a Royer Inverter. With the variation in input voltage, the output voltage level varies accordingly to result in undesirable change in the brightness of the CCFL. In order to overcome this problem, a buck circuit (60) is integrated in the power conversion circuit to maintain a stable output voltage. However, since it is difficult to increase the efficiency of the buck circuit (60), the power conversion efficiency of the whole circuit would also be implicated accordingly.

With reference to FIG. 9, another prior art of the power conversion circuit for driving the CCFL is briefly depicted with the block diagrams in which the pulse width modulation (PWM) technique is adopted. A high frequency ramp signal is compared with a feedback voltage in a comparator to generate a PWM signal. It is noted that a continuously supplied ramp signal is required and is unable to be temporarily shut down. When it is necessary to adjust the brightness of the CCFL, it is usually implemented by either directly modifying the pulse width of the PWM signal or comparing the PWM signal with a low frequency oscillation signal to derive control signals with On and Off periods. However, even during the "Off" periods, the power conversion circuit still continuously provides the high frequency ramp signal. Most of the time, the CCFL is operated in said brightness adjusting mode. Therefore, according to an equation $P=CV^2f$, it is obvious to recognize that the circuit will meaninglessly consume a lot of power due to the continuously supplied high frequency ramp signal.

Therefore, it is desired to provide a novel power conversion circuit to obviate the aforementioned drawbacks.

SUMMARY OF THE INVENTION

The objective of the present invention is to provide a zero voltage switching (ZVS) power conversion circuit for a code cathode fluorescent lamp (CCFL), wherein a ZVS circuit is applied to control switching elements of the power conversion circuit being alternately conducted so as to transfer power to the CCFL. When adjusting the brightness of the CCFL, a high frequency oscillation circuit is able to be temporarily shut down during the off periods of the CCFL, whereby meaningless power consumption is greatly reduced.

Other objects, advantages, and unique features of the invention will become more apparent from the following detailed description and accompanying drawings.

DETAILED DESCRIPTION OF THE PREFERRED EMBODIMENT

Figure 1:
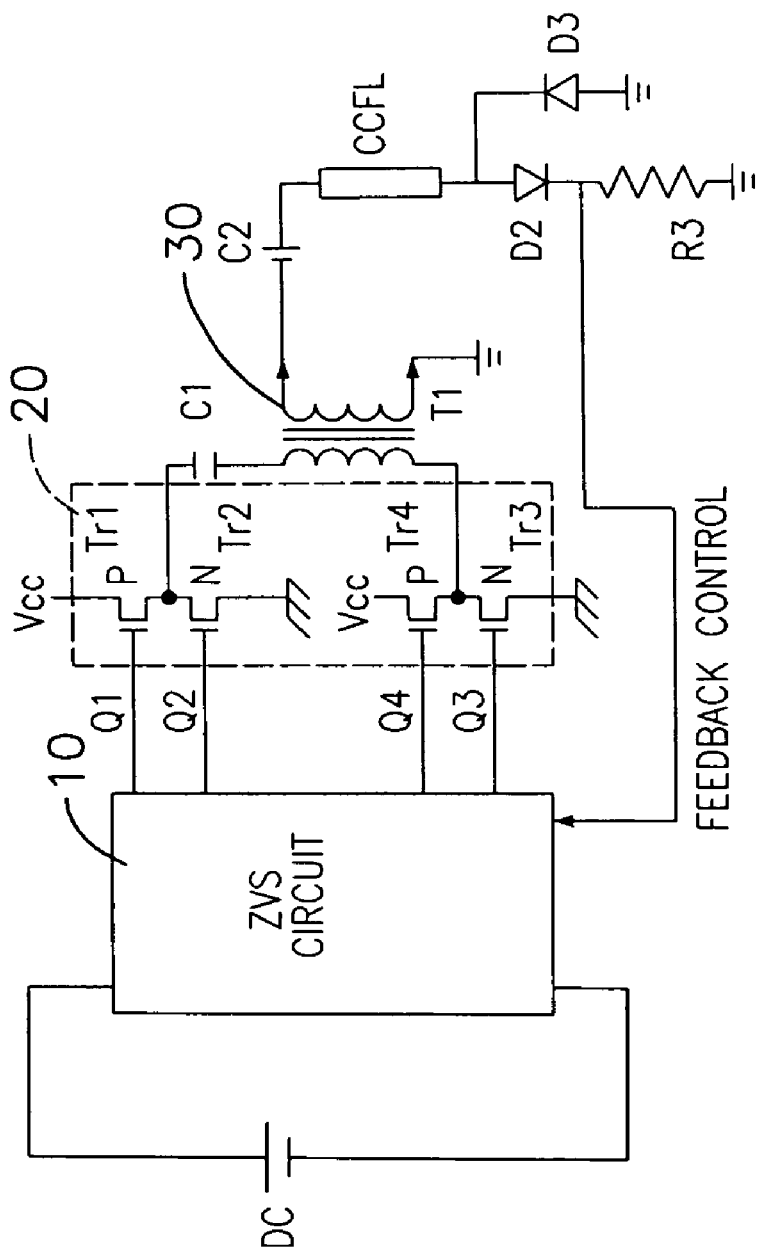
FIG. 1 is a block diagram of a zero voltage switching power conversion circuit in accordance with the present invention.

With reference to FIG. 1, a zero voltage switching (ZVS) circuit (10) is coupled to a full bridge circuit (20) consisting of a first pair of transistors (Tr1, Tr2) and a second pair of transistors (Tr3, Tr4). The full bridge circuit (20) further couples to a primary side of a transformer (30). Each pair of the transistors is formed by two matched transistors, i.e. a PMOS transistor (Tr1, Tr4) and an NMOS transistor (Tr2, Tr3). For each pair of the transistors, drain terminals of both the PMOS (Tr1) and the NMOS (Tr2) transistors are connected together to form an output terminal. A capacitor and the primary side of the transformer (30) are coupled in series between the two output terminals. The transformer (30) with a secondary side couples to a cold cathode fluorescent lamp (CCFL) load through an output capacitor (C2). The ZVS circuit (10) outputs driving signals to properly determine the activated/deactivated timing of each transistor (Tr1–Tr4).

Figure 2:
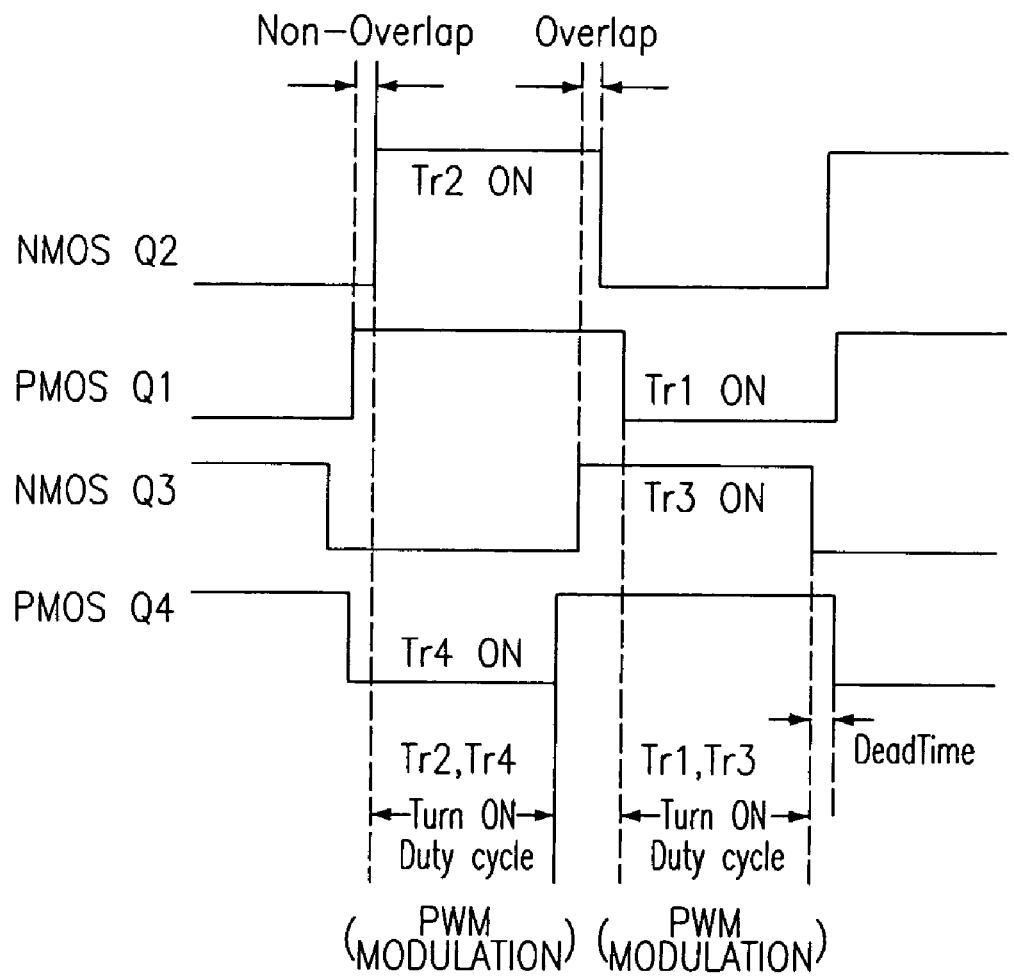
FIG. 2 is a timing diagram of four driving signals in accordance with the present invention.

With reference to FIGS. 1 and 2, the driving signals for the above mentioned transistors (Tr1–Tr4) are respectively denoted by Q1–Q4. The first PMOS transistor (Tr1) and the first NMOS transistor (Tr2) are alternately conducted. That means during the activated period of the first PMOS transistor (Tr1), the first NMOS transistor (Tr2) is not conducting. At the same time, the second PMOS transistor (Tr4) is not conducting while the second NMOS transistor is contrarily conducting, whereby a current at the primary side of the transformer (30) sequentially flows through the first PMOS transistor (Tr1), the capacitor (C1), the second NMOS transistor (Tr3) and to ground. When the period ends, each transistors (Tr1–Tr4) changes its original status thus allowing a current to reversely flow through the second PMOS transistor (Tr4), the capacitor (C1) and the first NMOS transistor (Tr2). The current flowing change occurring at the primary side of the transformer (30) induces an induced current at the secondary side to drive the CCFL load.

The conducting time of each transistor (Tr1–Tr4) is controllable by determining a feedback parameter from the CCFL load to the ZVS circuit (10). As shown in FIG. 2, a short interval named "non-overlap time" exists between the two conducting periods of the first PMOS transistor (Tr1) and the first NMOS transistor (Tr2). Similarly, the second PMOS transistor (Tr3) and the second NMOS transistor (Tr4) also have a non-overlap time between their conducting periods. The non-overlap time is to ensure that both the paired NMOS/PMOS transistors (Tr1,Tr2) (Tr3,Tr4) will not conduct simultaneously.

The full bridge circuit (20) is able to be operated in a self-resonate mode by adjusting the conducting period of the two transistors (Tr2 and Tr4) and the two transistors (Tr1 and Tr3), selecting a transformer (30) with desired leakage-inductance, and choosing desired impedance value of the capacitor and the load. When using the self-resonate mode, the time interval (Dead time) from the beginning of the OFF period of the transistor Tr3 (or Tr2) to the beginning of the ON period of the transistor Tr4 (or Tr1) must be carefully controlled to minimize switching loss.

Figure 3:
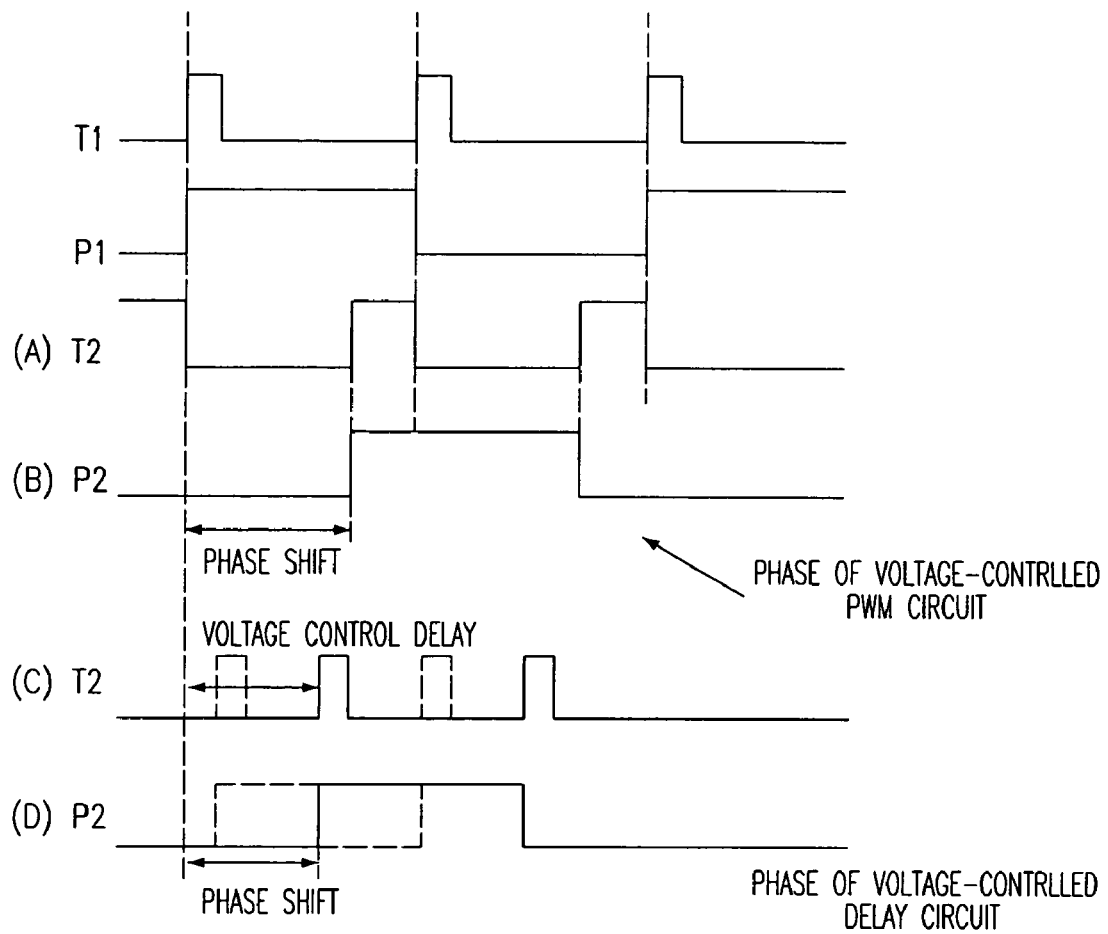
FIG. 3 is a timing diagram of signals generated by a voltage-controlled PWM circuit and a voltage-controlled delay circuit of the present invention.
Figure 4:
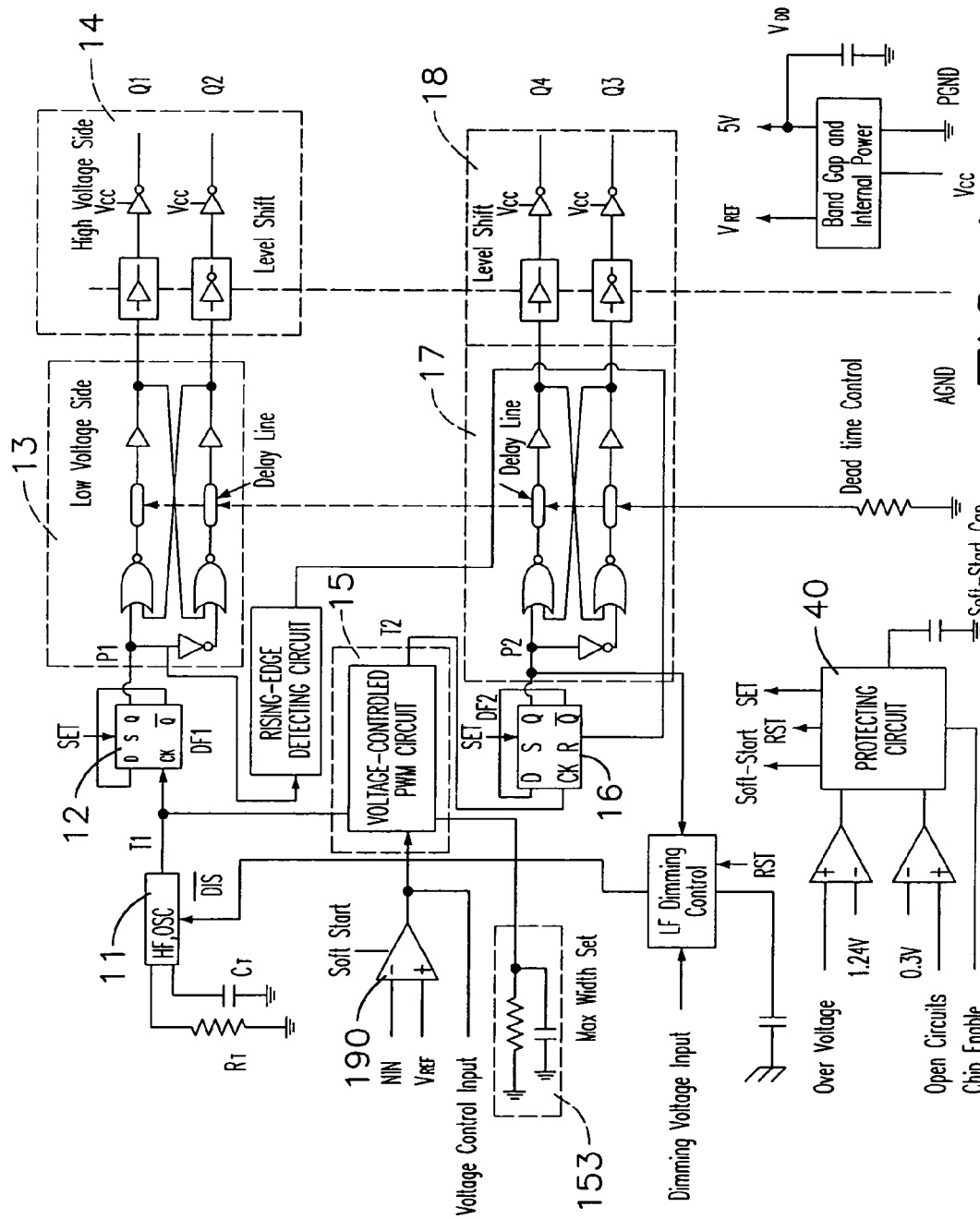
FIG. 4 is a detailed circuit diagram of one preferred embodiment of a ZVS power conversion circuit in accordance with the present invention.

With reference to FIGS. 3 and 4, the ZVS circuit (10) mainly comprises a high frequency oscillation circuit (11), a first divider (12), a first controllable non-overlap circuit (13), a first voltage level booting circuit (14), a voltage-controlled PWM circuit (15), a second divider (16), a second controllable non-overlap circuit (17) and a second voltage level booting circuit (18).

The high frequency oscillation circuit (11) generates a high frequency signal T1 with a frequency value equal to the double operating frequency of the CCFL.

The first divider (12) has an input terminal connected to the high frequency oscillation circuit (11) to receive the high frequency signal T1. The high frequency signal T1 is processed by the first divider (12) to become a first driving signal P1 for the CCFL.

The first controllable non-overlap circuit (13) composed of multiple logic components receives the first driving signal P1 from the first divider (12) and generates two non-overlapped signals based on the first driving signal P1.

The first voltage level booting circuit (14) is used to boot the voltage level of the two non-overlapped signals output from the first controllable non-overlap circuit (13) so as to derive first and second driving signals (Q1,Q2) respectively applied to the first PMOS transistor (Tr1) and the first NMOS transistor (Tr2).

The voltage-controlled pulse width circuit (15) receives the high frequency signal T1 from the high frequency oscillation circuit (11) and then shifts its phase thus obtaining a phase-shifted high frequency signal T2.

The second divider (16) with an input terminal to receive the phase-shifted high frequency signal T2, divides the frequency of the phase-shifted high frequency signal T2 by two so as to derive a second driving signal P2. Using the rising edge of the first driving signal P1 as a base point, the phase of the second driving signal P2 could be shifted and be 180 degrees different from that of the first driving signal P1.

The second controllable non-overlap circuit (17) is also composed of multiple logic components, but receives the second driving signal P2 from the second divider (16) and generates two non-overlapped signals based on the second driving signal P2.

The second voltage level booting circuit (18) is used to boot the voltage level of the two non-overlapped signals output from the second controllable non-overlap circuit (17) to derive third and fourth driving signals (Q3,Q4) that are respectively applied to the second PMOS transistor (Tr3) and the second NMOS transistor (Tr4).

Figure 5:
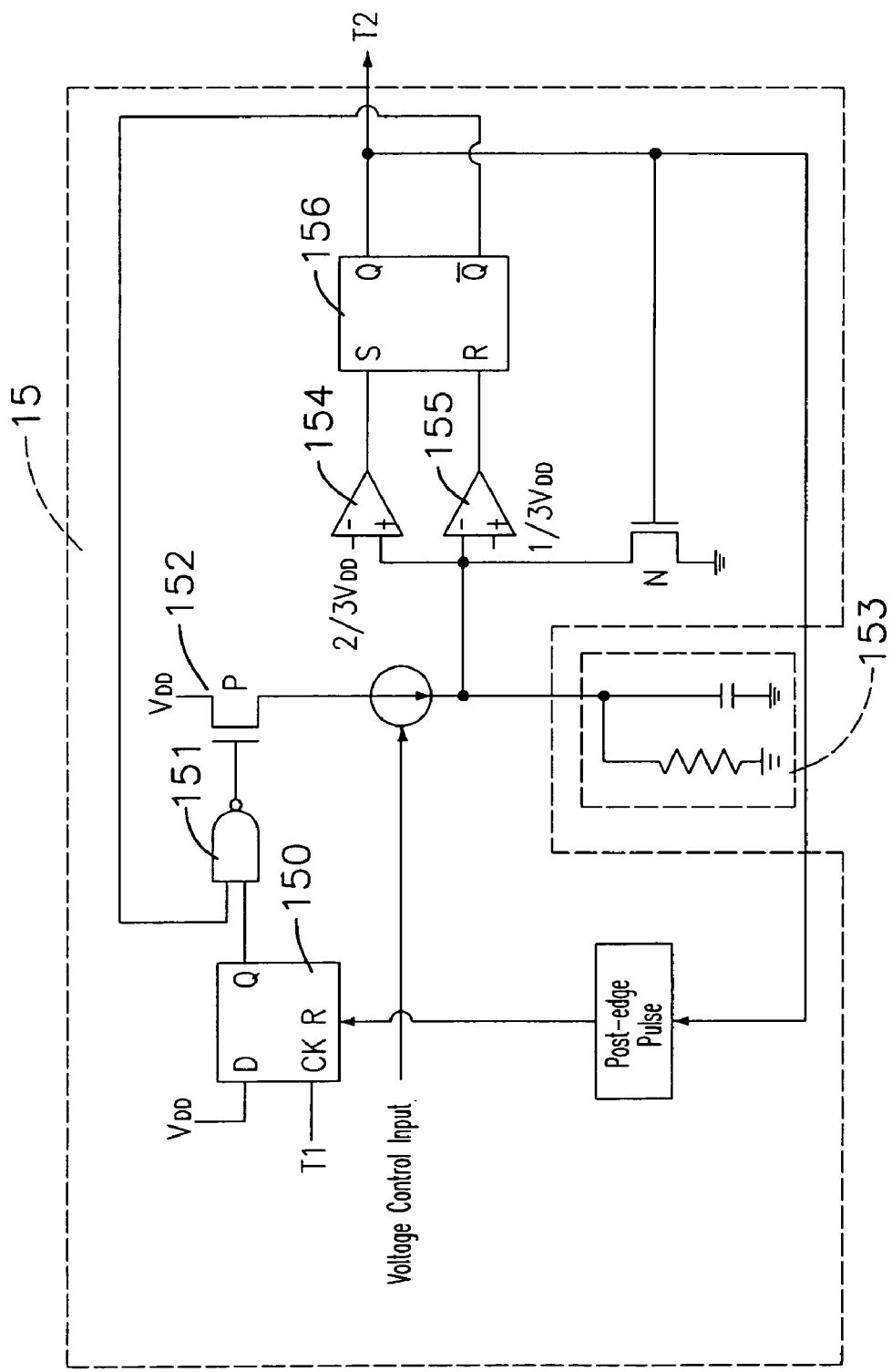
FIG. 5 is a detailed circuit diagram of a voltage-controlled pulse width circuit in the ZVS power conversion circuit of FIG. 4.

The more detailed architecture of the voltage-controlled pulse width circuit (15) is depicted in FIG. 5. The voltage-controlled pulse width circuit (15) broadly comprises a D-type flip flop (150), a NAND gate (151), a switching element (152), a first comparator (154), a second comparator (155) and an SR-type flip flop (156).

The D-type flip flop (150) has an input terminal D to connect an operating voltage $V_{DD}$ and a clock input terminal CK to receive the high frequency signal T1.

The NAND gate (151) has a first input terminal to connect to an output terminal Q of the D-type flip flop (150).

The switching element (152), composed of a MOS transistor, is connected between the operating voltage $V_{DD}$ and an RC circuit (153), wherein a gate terminal of the MOS transistor is connected to the output terminal of the NAND gate (151).

The first comparator (154) has an inverse input terminal (−) connected to a first voltage Vx, i.e. the ⅔ VDD in the preferred embodiment, and has a non-inverse input terminal (+) connected to ground through an NMOS transistor.

The second comparator (155) provides a non-inverse input terminal (+) to receive a second voltage Vy lower than the first voltage Vx, i.e. the ⅓ $V_{DD}$ in the preferred embodiment. An inverse input terminal (−) of the second comparator (155) is coupled to the RC circuit (153) and the non-inverse input terminal of the first comparator (154).

The SR-type flip flop (156) has input terminals S and R to respectively connect to the outputs of the first comparator (154) and the second comparator (155). The signal derived at a first output terminal Q of the SR flip flop (156) is the phase-shifted high frequency signal T2, which is further fedback to an input terminal R of the D-type flip flop (150) and applied to control the gate of the foregoing NMOS transistor connected to the second comparator (155). Another output terminal not-Q ($\overline{Q}$) is fedback to a second input terminal of the NAND gate (151).

Figure 6:
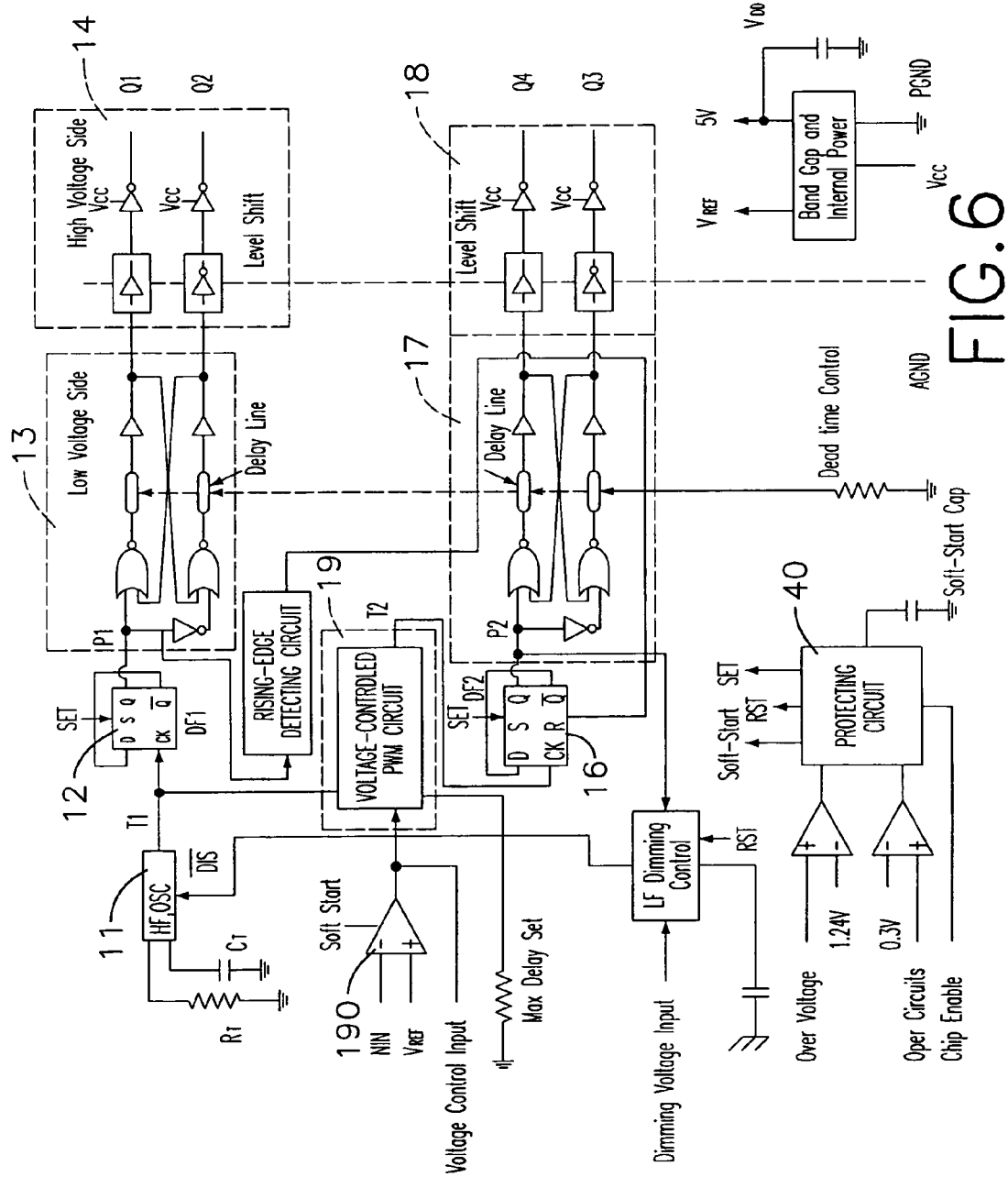
FIG. 6 is another detailed circuit diagram of one preferred embodiment of a ZVS power conversion circuit in accordance with the present invention.
Figure 7:
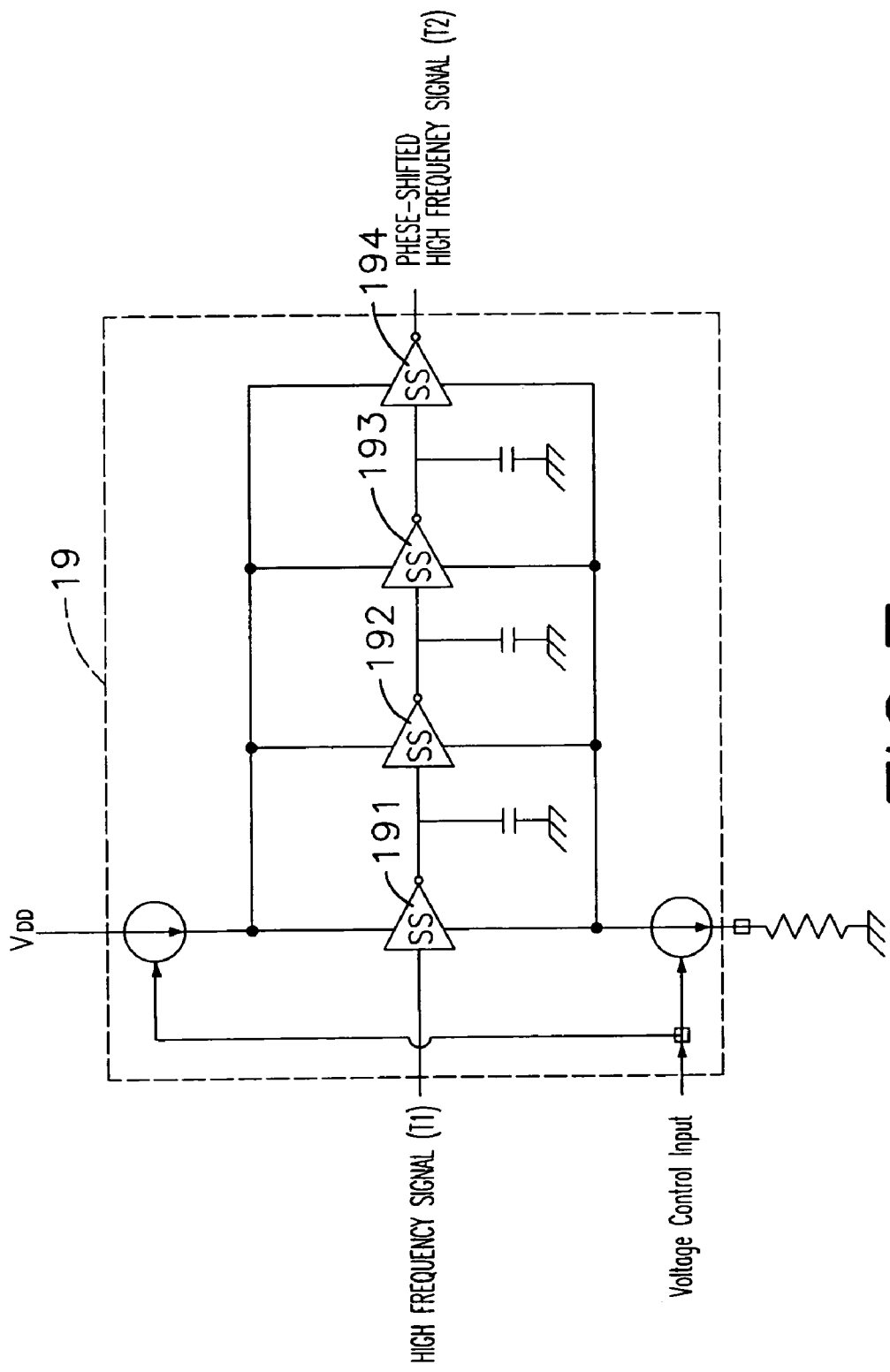
FIG. 7 is a detailed circuit diagram of a voltage-controlled delay circuit in the ZVS power conversion circuit of FIG. 6.
Figure 8:
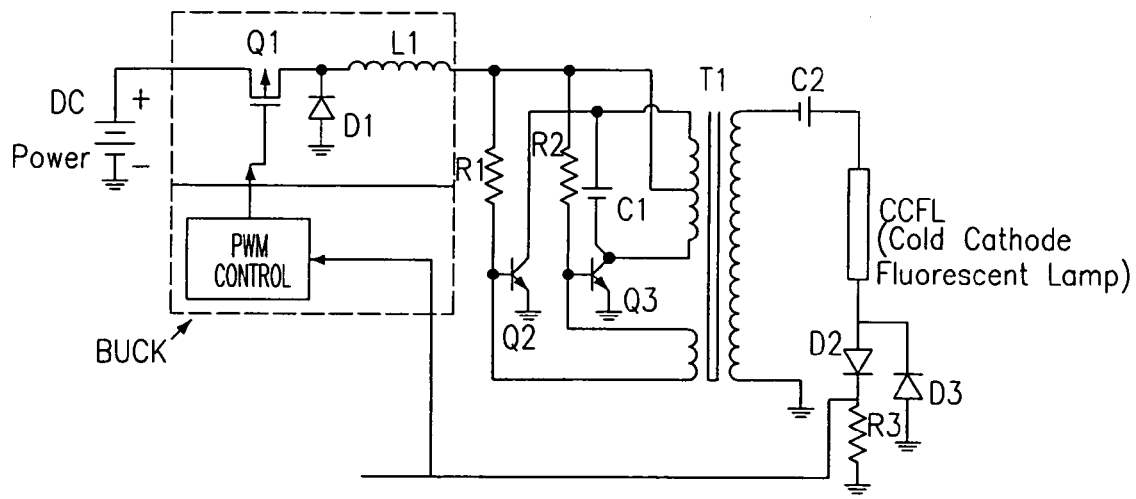
FIG. 8 is conventional Diming control for a cold cathode fluorescent lamp (CCFL)
Figure 9:
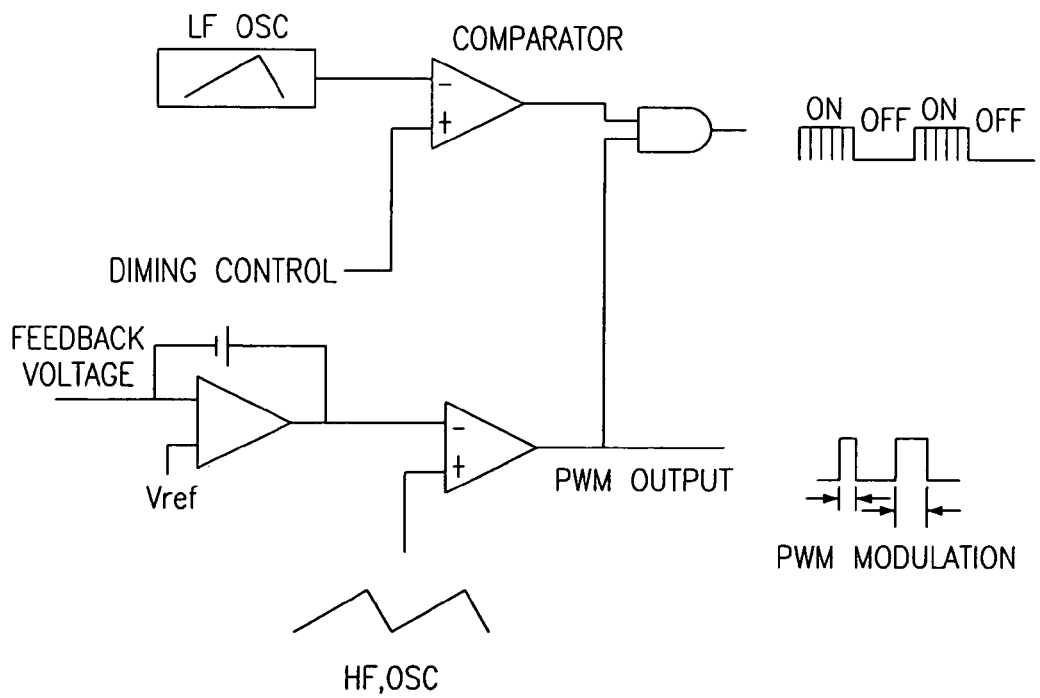
FIG. 9 is an exemplary diagram of another conventional power conversion circuit.

With reference to FIG. 6, another preferred embodiment of the ZVS circuit (10) according to the present invention is substantially the same as the first one of FIG. 4, wherein the modification in FIG. 6 is that the voltage-controlled PWM circuit (15) has been replaced by a voltage-controlled delay circuit (19). The voltage-controlled delay circuit (19) also receives the high frequency signal T1 and shifts its phase to derive the phase-shifted high frequency signal T2. An exemplary phase-shifted high frequency signal T2 is illustrated by waveform (C) on FIG. 3. The shifted quantity of the phase-shifted high frequency signal T2 is adjustable dependent on practical circuit requirements. The waveform (C) illustrated by dotted lines and solid lines of FIG. 3 respectively represents two kinds of phase-shifted high frequency signal T2 with different phase shifting extents. Whatever the shifting extent the signal T2 has, the phase-shifted high frequency signal T2 is further processed by the second divider (16) to obtain the second driving signal P2 as shown by waveform (D) of FIG. 3.

In more detail, the voltage-controlled delay circuit (19) is shown in FIG. 6 and comprises a plurality of delay gates (191–194) coupled in series, wherein the high frequency signal T1 is input to these delay gates (191–194) thus generating the phase-shifted high frequency signal T1.

A voltage input control signal is applied in either the voltage-controlled pulse width circuit (15) or the voltage-controlled delay circuit (19). The voltage input control signal is generated by in such a way that a current feedback signal (NIN) derived from the CCFL is compared with an internal reference voltage (Vref) in an error comparator (190), where the output signal of the error comparator (190) is the voltage input control signal.

In comparison of the present invention with the prior arts, the present invention is able to mitigate power consumption when adjusting the CCFL brightness since the high frequency signal T1 will be properly shut down. In more detail, the present invention modulates a low frequency ramp signal with a dimming input voltage. When the modulated signal is synchronized with the rising edge of the second driving signal P2, the high frequency signal T1 is able to be shut down to ensure that the two NMOS transistors Tr2 and Tr3 are activated and the two PMOS transistors are deactivated when the CCFL is in "Off" periods. Since the two PMOS transistors are not conducting, there is no current flowing through the transformer (30). Meanwhile because the high frequency oscillation circuit (11) has been shut down, a great quantity of power consumption is prevented.

With reference to FIGS. 4 and 6, to prevent an over voltage situation or an open circuit at the CCFL, a protecting circuit (40) is integrated in the ZVS circuit (10). The protecting circuit (40) uses a plurality of input terminals to detect whether the over voltage or the open circuit situation occurs.

In conclusion, the present invention uses the ZVS circuit as well as a full fridge circuit to control the CCFL so that the switching loss of the power conversion circuit is able to be minimized. Moreover, when adjusting the brightness of the CCFL, the high frequency oscillation circuit is properly shut down to reduce power consumption.

It is to be understood, however, that even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A zero voltage switching power conversion circuit comprising:
   a zero voltage switching (ZVS) circuit (10) coupled to a full bridge (20) composing of a first pair of transistors (Tr1,Tr2) and a second pair of transistors (Tr3, Tr4), each pair of transistors including a PMOS transistor (Tr1, Tr4) connected to an NMOS transistor (Tr2, Tr3); and
   a transformer (30) having a primary side coupled to the full bridge (20) and a secondary side coupled to a load through an output capacitor (C2);
   wherein the ZVS switching circuit (10) further comprises:
      a high frequency oscillation circuit (11), which generates a high frequency signal T1;
      a first divider (12) with an input terminal connected to the high frequency oscillation circuit (11) to receive the high frequency signal T1, wherein the frequency of the high frequency signal T1 is divided by the first divider (12) to obtain a first driving signal P1;
      a first controllable non-overlap circuit (13), which receives the first driving signal P1 from the first divider (12) and generates two non-overlapped signals based on the first driving signal P1;
      a first voltage level booting circuit (14), which boots voltage levels of the two non-overlapped signals output from the first controllable non-overlap circuit (13) so as to derive a first driving signal (Q1) and a second driving signal (Q2) respectively applied to a corresponding one of the first pair of transistors (Tr1, Tr2);
      a voltage-controlled PWM circuit (15) to receive the high frequency signal T1 from the high frequency oscillation circuit (11) and then shifts its phase thus obtaining a phase-shifted high frequency signal T2;
      a second divider (16), which receives the phase-shifted high frequency signal T2, divides the frequency of the phase-shifted high frequency signal T2 to derive a second driving signal P2;
      a second controllable non-overlap circuit (17), which receives the second driving signal P2 from the second divider (16) and generates two non-overlapped signals based on the second driving signal P2; and
      a second voltage level booting circuit (18), which boots voltage levels of the two non-overlapped signals output from the second controllable non-overlap circuit (17) to derive a third driving signal (Q3) and a fourth driving signal (Q4) that are respectively applied to a corresponding one of the second pair of transistors (Tr3 Tr4);
   said four driving signals (Q1–Q4) respectively applied to control the four transistors to determine conducting and non-conducting periods of each transistor.

2. A zero voltage switching power conversion circuit comprising:
   a zero voltage switching (ZVS) circuit (10) coupled to a full bridge (20) composing of a first pair of transistors (Tr1,Tr2) and a second pair of transistors (Tr3, Tr4), each pair of transistors including a PMOS transistor (Tr1, Tr4) connected to an NMOS transistor (Tr2, Tr3); and
   a transformer (30) having a primary side coupled to the full bridge (20) and a secondary side coupled to a load through an output capacitor (C2);
   wherein the ZVS switching circuit (10) further comprises:
      a high frequency oscillation circuit (11), which generates a high frequency signal T1;
      a first divider (12) with an input terminal connected to the high frequency oscillation circuit (11) to receive the high frequency signal T1, wherein the frequency of the high frequency signal T1 is divided by the first divider (12) to obtain a first driving signal P1;
      a first controllable non-overlap circuit (13), which receives the first driving signal P1 from the first divider (12) and generates two non-overlapped signals based on the first driving signal P1;
      a first voltage level booting circuit (14), which boots voltage levels of the two non-overlapped signals output from the first controllable non-overlap circuit (13) so as to derive a first driving signal (Q1) and a second driving signal (Q2)*respectively applied to the first pair of transistors (Tr1, Tr2);
      a voltage-controlled delay circuit (19) to receive the high frequency signal T1 from the high frequency oscillation circuit (11) and then delays its phase thus obtaining a phase-shifted high frequency signal T2;
      a second divider (16), which receives the phase-shifted high frequency signal T2, divides the frequency of the phase-shifted high frequency signal T2 to derive a second driving signal P2;
      a second controllable non-overlap circuit (17), which receives the second driving signal P2 from the second divider (16) and generates two non-overlapped signals based on the second driving signal P2; and
      a second voltage level booting circuit (18), which boots voltage levels of the two non-overlapped signals output from the second controllable non-overlap circuit (17) to derive a third driving signal (Q3) and a fourth driving signal (Q4) that are *respectively applied to the second pair of transistors (Tr3 Tr4);

said four driving signals (Q1–Q4) respectively applied to control the four transistors to determine conducting and non-conducting periods of each transistor.

3. The ZVS power conversion circuit as claimed in claim 1, wherein the voltage-controlled pulse width circuit (15) comprises:
   a D-type flip flop (150) having an input terminal to connect an operating voltage $V_{DD}$ and a clock input terminal CK to receive the high frequency signal T1;
   a NAND gate (151) having a first input terminal to connect to an output terminal Q of the D-type flip flop (150);
   a switching element (152), composed of a MOS transistor, connected between the operating voltage $V_{DD}$ and an RC circuit (153), wherein a gate terminal of the MOS transistor is connected to an output terminal of the NAND gate (151);
   a first comparator (154), which has an inverse input terminal connected to a first voltage Vx, and has a non-inverse input terminal connected to ground through an NMOS transistor;
   a second comparator (155), which has a non-inverse input terminal to receive a second voltage Vy lower than the first voltage Vx, and has an inverse input terminal coupled to the RC circuit (153) and the non-inverse input terminal of the first comparator (154);
   an SR-type flip flop (156), which has input terminals S and R to respectively connect to the outputs of the first comparator (154) and the second comparator (155); wherein the signal derived at a first output terminal Q of the SR-type flip flop (156) is the phase-shifted high frequency signal T2, which is further fedback to an input terminal R of the D-type flip flop (150) and applied to control the gate of the foregoing NMOS transistor connected to the second comparator (155), wherein a second output terminal not-Q ($\overline{Q}$) of the SR-type flip flop (156) is fedback to a second input terminal of the NAND gate (151).

4. The ZVS power conversion circuit as claimed in claim 3, wherein the first voltage Vx applied to the first comparator is $\frac{2}{3}V_{DD}$ and the second voltage Vy applied to the second comparator is $\frac{1}{3}V_{DD}$.

5. The ZVS power conversion circuit as claimed in claim 2, wherein the voltage-controlled delay circuit comprises a plurality of delay gates connected in series to delay the high frequency signal T1.

6. The ZVS power conversion circuit as claimed in claim 1, wherein when the load coupled to the transformer (30) is in off periods, the two NMOS transistors are both activated and the two PMOS transistors are both deactivated.

7. The ZVS power conversion circuit as claimed in claim 2, wherein when the load coupled to the transformer (30) is in off periods, the two NMOS transistors are both activated and the two PMOS transistors are both deactivated.

8. The ZVS power conversion circuit as claimed in claim 3, wherein when the load coupled to the transformer (30) is in off periods, the two NMOS transistors are both activated and the two PMOS transistors are both deactivated.

9. The ZVS power conversion circuit as claimed in claim 4, wherein when the load coupled to the transformer (30) is in off periods, the two NMOS transistors are both activated and the two PMOS transistors are both deactivated.

10. The ZVS power conversion circuit as claimed in claim 5, wherein when the load coupled to the transformer (30) is in off periods, the two NMOS transistors are both activated and the two PMOS transistors are both deactivated.

11. The ZVS power conversion circuit as claimed in claim 6, wherein the ZVS circuit (10) further comprises a protection circuit (40) with input terminals to detect whether an over voltage or an open circuit situation occurs at the load.

12. The ZVS power conversion circuit as claimed in claim 7, wherein the ZVS circuit (10) further comprises a protection circuit (40) with input terminals to detect whether an over voltage or an open circuit situation occurs at the load.

13. The ZVS power conversion circuit as claimed in claim 8, wherein the ZVS circuit (10) further comprises a protection circuit (40) with input terminals to detect whether an over voltage or an open circuit situation occurs at the load.

14. The ZVS power conversion circuit as claimed in claim 9, wherein the ZVS circuit (10) further comprises a protection circuit (40) with input terminals to detect whether an over voltage or an open circuit situation occurs at the load.

15. The ZVS power conversion circuit as claimed in claim 10, wherein the ZVS circuit (10) further comprises a protection circuit (40) with input terminals to detect whether an over voltage or an open circuit situation occurs at the load.

16. The ZVS power conversion circuit as claimed in claim 1, wherein the load coupled to the transformer (30) is a cold cathode fluorescent lamp.

17. The ZVS power conversion circuit as claimed in claim 10, wherein the load coupled to the transformer (30) is a cold cathode fluorescent lamp.

18. The ZVS power conversion circuit as claimed in claim 15, wherein the load coupled to the transformer (30) is a cold cathode fluorescent lamp.

19. A method for controlling a ZVS power conversion circuit comprising the acts of:
   providing a high frequency signal T1;
   dividing the frequency of said high frequency signal T1 to obtain a first driving signal P1;
   shifting said high frequency signal T1 to obtain a phase-shifted high frequency signal T2;
   dividing the frequency of said phase-shifted high frequency signal T2 to obtain a second driving signal P2, wherein the phase of the second driving signal P2 is different from that of the first driving signal P1;
   generating a first non-overlap signal Q1 and a second non-overlap signal Q2 based on the first driving signal P1;
   generating a third non-overlap signal Q3 and a fourth non-overlap signal Q4 based on the second driving signal P1;
   applying said four non-overlap signals Q1–Q4 to four switching elements of the ZVS power conversion circuit so as to drive a load coupled to the ZVS power conversion circuit.

20. The method as claimed in claim 19, wherein before applying said four non-overlap signals Q1–Q4 to the switching elements, the method further comprising a booting act to boot voltage level of each non-overlap signal.

* * * * *